Aug. 25, 1964  K. P. MUELLER  3,145,722
PNEUMATIC CONTROLLER
Filed Feb. 28, 1962  3 Sheets-Sheet 1

INVENTOR.
KLAUS PETRO MUELLER
BY
*Mead, Browne, Schuyler, & Beveridge*
ATTORNEYS.

Aug. 25, 1964  K. P. MUELLER  3,145,722
PNEUMATIC CONTROLLER

Filed Feb. 28, 1962  3 Sheets-Sheet 3

INVENTOR.
KLAUS PETRO MUELLER

BY
Mead, Browne, Schuyler & Beveridge
ATTORNEYS.

United States Patent Office 3,145,722
Patented Aug. 25, 1964

3,145,722
PNEUMATIC CONTROLLER
Klaus P. Mueller, Goshen, Ind., assignor to Robertshaw Controls Company, Richmond, Va., a corporation of Delaware
Filed Feb. 28, 1962, Ser. No. 176,210
9 Claims. (Cl. 137—85)

This invention relates to pneumatic controllers for controlling a condition by positioning a valve or other control element in repsonse to a control pressure or force.

Industrial processes may be controlled by measuring variable conditions such as temperature, humidity, flow, etc., and utilize control apparatus to maintain such conditions at a desired value by manipulating some variable such as a flow of liquid, which effects the control variable. For example, if temperature is being controlled, fluid fuel may be supplied at a constant rate to a heater, the rate of flow being determined by the temperature that is desired to be maintained. To maintain this rate of flow, a control element such as a valve is positioned in the fuel conduit to permit the proper rate of flow. However, should the temperature deviate from the desired value due to some external factor, it becomes necessary to change the position of the valve to either increase or decrease the rate of flow until the deviation has been corrected, and the temperature returned to normal. Control apparatus are thus employed which receive a signal, such as a pressure signal, upon a variation in the control condition, which signal is converted into a controlling pressure that acts upon the valve to change the position in accordance with the variation, the valve remaining in the new position until the condition returns to normal. Various controllers have been devised for this purpose utilizing external linkages, springs, etc., connected to an operating piston or diaphragm of an element positioning motor.

It is an object of this invention to provide improved apparatus for positioning a control element in accordance with a fixed relationship to a control force.

A further object is to provide improved apparatus for positioning a control element in which the tendency of the control element to "hunt" or overshoot is reduced.

Another object is to provide an improved positioning device having no external linkages or springs.

Still another object is to provide an improved positioner for controlling the position of an element through a pneumatic motor having a piston or diaphragm operator in which no mechanical connection between the operator and the positioner is required.

Another object is to provide a positioner that can be mounted on the top of a valve operating motor with no external moving parts, and with no mechanical connection to the valve operator diaphragm, piston, stem or other moving valve part, and which is suitable for either direct or reverse action on the valve.

Another object is to provide a positioner having an improved pneumatic relay device for converting a control signal into a controlling pressure.

Another object lies in the provision of a positioner in which the ratio of movement of the control element to the magnitude of the signal force can be infinitely adjusted.

The objects are attained by the provision of a base member which is mounted on a valve operating motor and has formed therein an expansible signal chamber. Pivoted at one end to the movable wall of the signal chamber is a control lever which is fulcrumed intermediate its end on a sensing lever which in turn is fulcrumed on a rotatable cam. Expansion of the signal chamber in response to variations in a controlled condition causes the control lever to pivot about its fulcrum with its free end engaging a flapper adjacent the nozzle of a pneumatic relay assembly which is also mounted on the base. Movement of the flapper toward the nozzle increases the pressure back of the nozzle and causes the relay to transmit an output pressure to one side of the valve operating diaphragm changing the position of the valve. The diaphragm is interconnected with the cam shaft and causes it to rotate upon movement of the diaphragm. Rotation of the cam causes the control lever to pivot in an opposite direction to permit the flapper to move away from the nozzle until the system pressures balance with the valve in its new position.

Other objects and advantages of the invention will become apparent from the following description taken in connection with the accompanying drawings in which.

Figure 5:
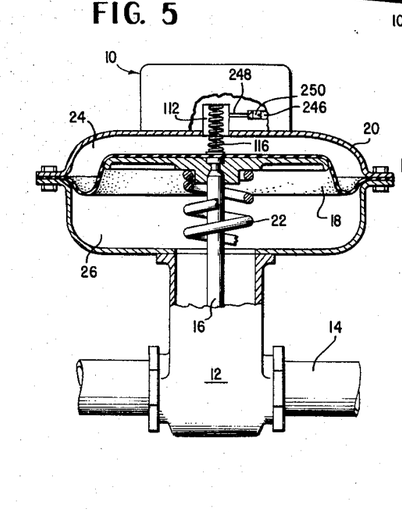
FIG. 5 is a diagrammatic view of the positioner mounted on a valve operating motor.

Referring first to FIG. 5, the pneumatic controller 10 of the invention is illustrated as controlling a condition by varying the opening of a control valve 12 in a conduit 14. Valve 12 has a stem 16 which extends upwardly from the valve casing and is connected with an operating member 18, in this case, a diaphragm, of a pneumatic motor 20. Diaphragm 18 is urged upwardly by a spring 22, and fluid pressure on top of the diaphragm urges the diaphragm downwardly against spring 22. Diaphragm 18 divides the interior of the casing of the motor into a pair of chambers 24 and 26, chamber 26 preferably communicating with atmosphere. Controller 10 is mounted on top of the casing of motor 20 and admits and exhausts pressure from chamber 24 to position the valve in a manner to be described below.

Figure 1:
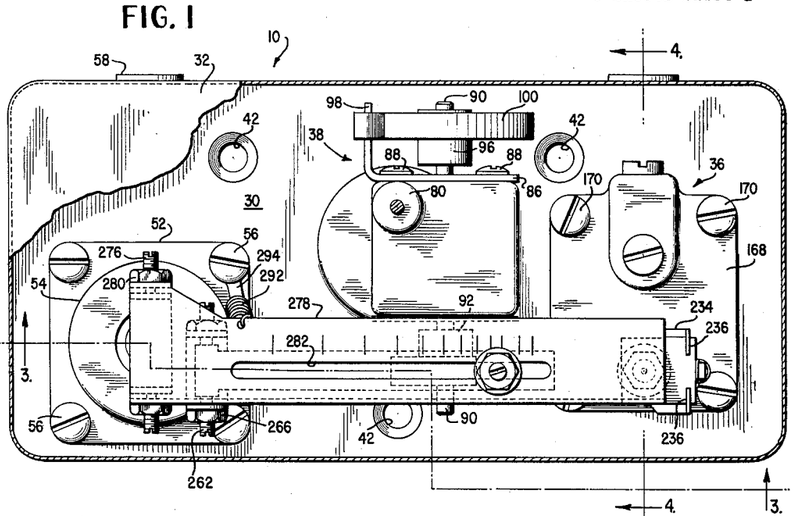
FIG. 1 is a top plan view of the positioner with the cover broken away.
Figure 2:
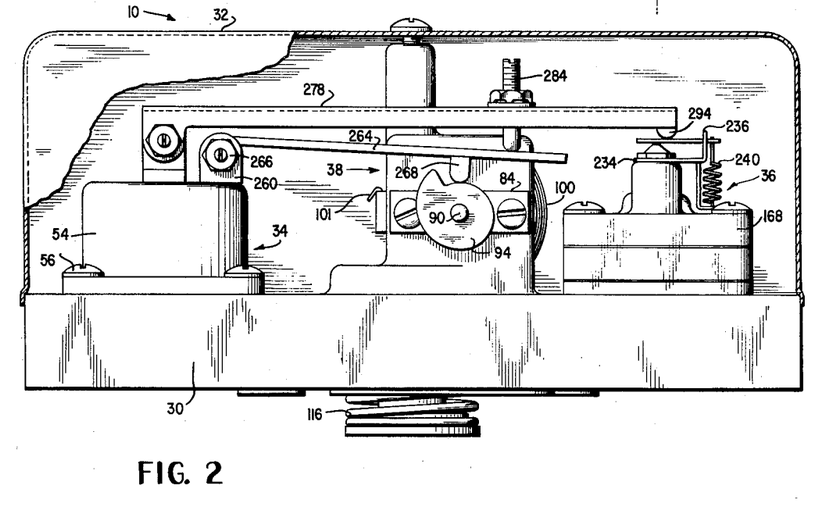
FIG. 2 is a front view of the positioner with the cover broken away.
Figure 3:
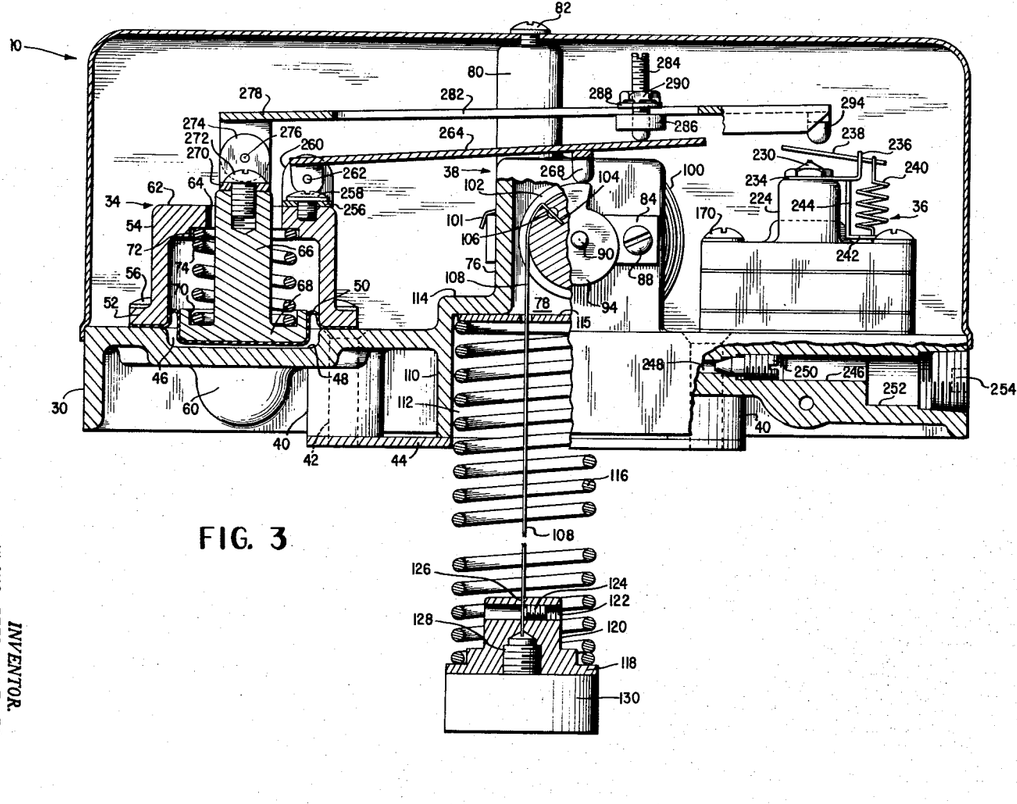
FIG. 3 is a view taken on line 3—3 of FIG. 1.

Referring now to FIGS. 1 through 3, the positioner 10 comprises a base member 30 with a cover member 32 mounted on the base to enclose the operating parts of the device. Base member 30 supports the components of the controller which include a condition responsive motor 34, a fluid relay 36 and motion responsive apparatus 38. For mounting the base member 30 on a valve operating motor, a plurality of bosses 40 (in this case, three) are formed on the base member 30 (see FIG. 3), and a mounting hole 42 is provided in each boss 40 for receiving a bolt or other conventional fastener. In order to seal the base member against the motor casing, a gasket 44 is compressed between the base member and the casing of the motor.

Condition responsive motor 34 comprises an expansible signal chamber 46, one wall of which is formed by a recessed wall 48 forming part of the base member 30, and the other wall of which is formed by a flexible diaphragm 50. Diaphragm 50 is securely clamped between base member 30 and flange 52 of a housing 54. Screws 56 extend through flange 52 to secure housing 54 to the base.

Signal chamber 46 communicates with a port 58 (FIG. 1) through a passage in an enlarged boss 60 (FIG. 3) formed on base member 30. Port 58 may be connected with a source of variable pressure for applying a control force through the condition responsive motor 34 in accordance with variations in the condition being controlled by valve 12.

Housing 54 has an upper wall 62 with an opening 64 therethrough. Extending through opening 64 is the stem 66 of a plunger element 68 which engages the upper side of diaphragm 50. Recesses 70 and 72 are formed in plunger 68 and the end wall 62, respectively, for receiving the ends of a range spring 74 which biases plunger 68 in a direction to contract chamber 46. Fluid pressure in chamber 46 acts on the lower wall of diaphragm 50 to apply a control force on plunger 68 in opposition to the biasing force of range spring 74.

Formed integrally on base member 30 is a housing 76 which encloses a chamber 78. Projecting from housing 76 is an extension 80 which receives a screw 82 for securing cover 32 to the base member. Mounted on the front and rear walls, respectively of housing 76 are plate members 84 and 86 which are secured to the housing by screws 88.

Figure 4:
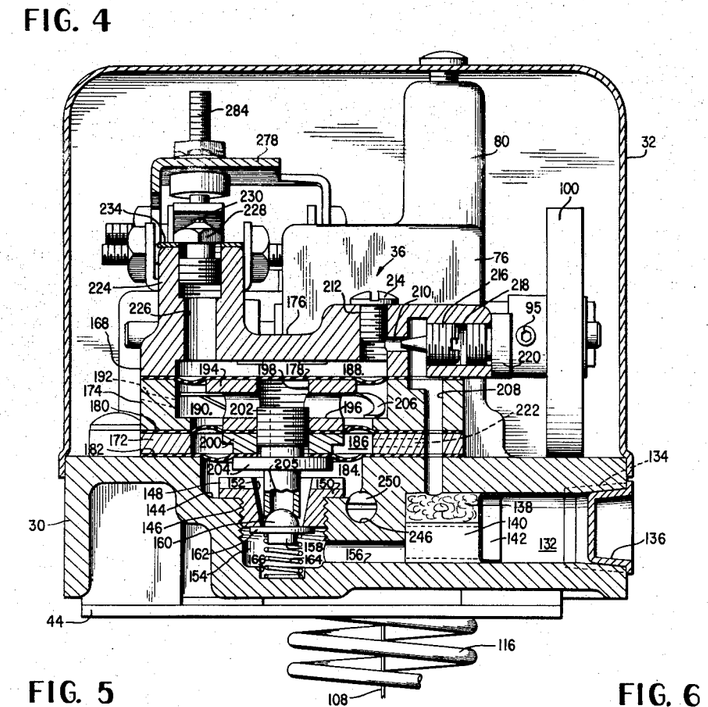
FIG. 4 is a view taken on line 4—4 of FIG. 1.

Rotatably supported in openings in plates 84 and 86 and extending through chamber 78 is a shaft 90. Mounted on the portion of shaft 90 extending from the front wall of housing 76 is a collar or hub 92 (FIG. 1), and a cam 94 is mounted on the shaft adjacent collar 92. Cam 94 is mounted for rotation with shaft 90 in any conventional manner. Mounted adjacent the opposite end of shaft 90 from cam 94 is a collar 96 which also is mounted for rotation with shaft 90. Collars 92 and 96 may be fixed against rotation relative to shaft 90 by means of a conventional set screw 95 (FIG. 4).

Projecting from one end of plate 86 (FIG. 1) is a leg member 98. For biasing shaft 90 against rotation, a spiral clock spring 100 has one end mounted on collar 96 and its free end 101 mounted on leg member 98. Spring 100 biases shaft 90 against counter-clockwise rotation as viewed in FIGS. 2 and 3.

Mounted in chamber 78 on shaft 90 is a pulley 102. Pulley 102 is provided with a slot 104 for connecting the pulley with one end 106 of a flexible sensing wire 108. Sensing wire 108 is wound around pulley 102 and, as is clear from FIG. 3, a downward pull on sensing wire 108 will tend to rotate shaft 90 in a counter-clockwise direction against the bias of spring 100. Formed beneath chamber 78 by depending wall 110 is a spring chamber 112. Wall 110 is offset laterally from the walls of chamber 78 to form a shoulder 114. Positioned against shoulder 114 is an apertured plate 115 providing a seat for one end of a motion sensing spring 116 and a guide for sensing wire 108. Sensing spring 116 has its other end seated against a flange 118 formed on a spring plate 120.

Spring plate 120 is provided with a lateral threaded bore 122 for receiving a screw 124. Intersecting bore 122 is a vertical opening 126 having a small diameter for receiving the free end of sensing wire 108. Screw 124 is positioned in bore 122 to engage sensing wire 108 and secure it to the spring plate. Spring plate 120 may be provided in its lower face with a tapped hole 128 for attachment of an extension plate 130 to make the control suitable for different valve operator sizes and dimensions.

Referring now to FIG. 4, a supply passage 132 is formed in base member 30. Supply passage 132 is internally threaded at 134 for connection with a conduit from a source of pressure fluid. When not in use, a cap plug 136 may be mounted in the inlet of the passage 132 to prevent the entry of foreign matter such as dust, dirt, etc. To filter the air supply into the relay, a cotton filter element 138 is positioned at the end of passage 132 by a clip 104 and a filter screen 142.

Formed in base member 30 is a recessed wall 144 having a threaded opening 146. Threadedly mounted in opening 146 is a valve seat element 148 with a slot 150 formed in its upper face for engagement with a suitable tool such as a screw-driver. Extending through valve seat element 148 is a tapered port 152. Opening 146 in wall 144 communicates with a pilot chamber 154 beneath wall 144. Pilot chamber 154 communicates with supply passage 132 through a passage 156.

For controlling fluid flow through port 152, a pilot valve 158 is mounted in pilot chamber 154. Pilot valve 158 comprises a hemispherical exhaust valve portion 160 and a flanged supply valve portion 162. Flanged portion 162 is biased into engagement with valve seat 148, to close port 152, by a spring 164 having one end seated against the underside of flange 162, and the other end seated in a recess 166 formed in the lower wall of chamber 154.

Relay 36 comprises a housing 168 which is secured to base 30 by mounting bolts 170 (FIGS. 1 and 2). Housing 168 is formed of apertured plate members 172 and 174, and a cover member 176. First, second and third diaphragms 178, 180 and 182, respectively, are clamped at their peripheries between the plate members, with the third diaphragm 182 being clamped between the base 30 and plate 172 to form with wall 144 a relay branch chamber 184. Diaphragm 180 forms one wall of a balance chamber 186, the lower wall of which is formed by diaphragm 182. Diaphragm 178 forms one wall of a control chamber 188, the upper wall of which is formed by cover plate 176. Diaphragms 178 and 180 form the upper and lower walls, respectively of an exhaust chamber 190 which communicates with atmosphere through an opening 192 in plate 174. Centrally mounted over diaphragm 180 is a pressure plate 194 having a lateral passage 196 intersected by a vertical threaded opening 198. Mounted between diaphragms 180 and 182 is a spacer plate 200 having a central threaded opening dispsosed in axial alignment with opening 198. Plates 194 and 200 are secured together by the threaded portion of a valve actuating stem 202. Diaphragm 180 is then clamped between plates 194 and 200 and diaphragm 182 is clamped between plate 200 and flange 204 of actuating stem 202. Valve actuating stem 202 is provided with an exhaust passage 205 which opens at one end into branch chamber 184 and at the other end into exhaust chamber 190. When the lower end of valve actuating stem 202 is seated against the hemispherical portion 160 of pilot valve 158 as shown in FIG. 4, communication is cut off between branch chamber 184 and exhaust chamber 190.

Mounted in exhaust chamber 190 is a helical spring 206 which has one end mounted on a shoulder formed on plate member 174, and the other end mounted against pressure plate 194 to bias pressure plate 194 and valve actuating stem 202 in an upward direction away from pilot valve 158.

Communicating with supply passage 132 is a passage 208 in the wall of the relay housing. Passage 208 connects at its upper end with a lateral passage 210 in the wall of control chamber 188. Intersecting passage 210 is a tapped hole 212 in cover member 46 which is closed from atmosphere from a screw 214. Fluid flow through passage 210 from passage 208 is controlled by an adjustable needle valve 216 received in threaded opening 218. Opening 218 is closed by a suitable threaded plug 220. Balance chamber 186 communicates with passage 208 through a passage 222.

Cover plate 176 is formed with an extension 224 having a passage 226 providing communication between control chamber 188 and atmosphere. Passage 226 is threaded at its end to receive a nozzle member 228 which provides a leak port 230 for control chamber 188. Mounted between the head of nozzle element 228 and extension 224 is a flapper retaining bracket 234 (see FIGS. 1, 2 and 3). Bracket 234 has a pair of upstanding legs 236 which are notched to receive a flapper valve 238 which is pivotally mounted on legs 236. Flapper 238 extends over leak port 230 and controls the rate of flow through the leak port. Flapper 238 is biased away from leak port 230 by a spring 240 having one end connected to the flapper and its other end attached to an ear 242 of a depending leg 244 on bracket 234.

Communicating with branch chamber 184 is a branch passage 246 (FIGS. 3 and 4). Branch passage 246 communicates with a passage 248, reduced in diameter, which connects with spring chamber 112. Branch passage 246 is threaded adjacent its junction with passage 248 to receive an adjustable valve 250 to provide a restriction for the flow to passage 248. Branch passage 246 communicates with an outlet 252 for a purpose to be described below. Outlet 252 is internally threaded to receive a plug 254 when not in use.

Referring again to FIGS. 1 through 3, housing 54 of the condition responsive motor has a bracket 256 secured to its upper wall by a screw 258. Apertured ears 260 on bracket 256 receive pivot screws 262 for pivotally mounting one end of a sensing lever 264 on bracket 256. Nuts 266 secure pivot screws 262 to the bracket. Sensing lever 264 is provided with a depending fulcrum 268 which rests against the surface of cam 90. Pivot screws 262 provide a fixed axis for sensing lever 264, and rotation of cam 90 causes the sensing lever to pivot about the fixed axis.

Mounted on the upper end of stem 66 is a bracket 270 secured to the stem by a screw 272. Bracket 270 is provided with apertured ears 274 for receiving pivot screws 276 which extend through cooperating apertures in a pair of depending ears at the end of a control lever 278. Nuts 280 on pivot screws 276 secure the parts together. Stem 66, bracket 270, pivot screws 276, etc., thus provide a movable axis for the end of control lever 278. Control lever 278 is provided with an elongated slot 282 along a portion of its length. Calibrated scale markings are provided in the upper surface of control lever adjacent slot 282 (FIG. 1). Adjustably positioned in slot 282 is a screw 284, the end of which engages sensing lever 264 providing a fulcrum for the control lever. Mounted on adjusting screw 284 adjacent the underside of control lever 278 is a slide nut 286, and a washer 288 is clamped on the upper side of the lever by a tension nut 290. Rotation of adjusting screw 284 causes it to move along the length of the slot 282 and control lever 278.

Control lever 278 and sensing lever 264 are biased into engagement with their respective fulcrums 284 and 264 by a tension spring 292 which has one end attached to control lever 278 and the other end attached to a spring retainer 294 secured to housing 54 (FIG. 1).

Control lever 278 extends past the end of sensing lever 264 and overlies leak port 230 and flapper 238 at its free end. Depending from the free end of the control lever is a flapper actuating tab 294. As viewed in FIG. 3, clockwise pivotal movement of control lever 278 about adjusting screw 284 will cause tab 294 to engage flapper 238 and pivot it toward leak port 30. Conversely, counterclockwise movement of control lever 278 about its movable axis from stem 66 causes tab 94 to move away from flapper 238 which in turn moves away from the leak port due to the bias of spring 240.

*Operation*

Base member 30 is mounted on a valve operating motor such as motor 20 (FIG. 5). Through an opening in the motor casing, spring plate 118 is positioned against diaphragm 18 of the motor and is maintained in engagement with the diaphragm by sensing spring 116 which is in compression between shoulder 114 and the diaphragm. Spring 22 of the valve operator is adjusted so that valve 12 is positioned to provide a constant rate of flow through conduit 14.

Signal port 58, which communicates with signal chamber 46, is connected with a source of variable pressure. Pressure in chamber 46 is responsive to variations in the controlled condition. For example, if temperature is being controlled by the amount of fluid supplied through conduit 14, port 58 may be connected with a pressure thermometer (not shown) that is adjusted to transmit a pressure signal to chamber 46 when the temperature varies from a desired value.

Referring to FIG. 4, supply passage 132 is connected with a source of air or other fluid at a constant pressure, which flows to pilot chamber 154 through passage 156, and from passage 208 through passages 210 and 222, respectively, to control chambers 188 and balance chamber 186. It should be noted that diaphragm 178 has a greater effective area than diaphragm 180, and diaphragm 180 has a greater effective area than diaphragm 182. Accordingly, fluid pressure in balance chamber 186 exerts a net force in an upward direction in opposition to the force exerted by the pressure in control chamber 188. Thus, exhaust passage 205 and valve actuating stem 202 is urged out of engagement with exhaust portion 160 of the pilot valve by both the pressure in balance chamber 186, and the biasing force of spring 206. With the flapper in the open position illustrated in FIG. 3 pressure in control chamber 188 is exhausted through leak port 230, and accordingly, valve actuating stem 202 is urged away from pilot valve 158, and branch chamber 184, passages 246 and 248, and chamber 24 of the valve operating motor are connected with atmosphere through passage 192.

Should the temperature vary from its desired value in a direction such that an increased amount of flow through conduit 14 past valve 12 is required in order to correct the variation and bring the temperature back to normal, a pressure signal is applied through port 58 to chamber 46. When the pressure in chamber 46 is sufficient to exert a force greater than the biasing force of range spring 74, plunger elements 68 will move upwardly with diaphragm 50 in response to the control force exerted by the signal pressure. Upward movement of plunger 68 causes control lever 278 to pivot about adjusting screw 284 in a clockwise direction as viewed in FIG. 3. When lever 278 pivots to a position in which tab 294 engages flapper 238, further clockwise pivotal movement will move the flapper toward the leak port 230, until the control lever 278 reaches the position illustrated in FIG. 2 with leak port 230 entirely closed by flapper 238.

Referring again to FIG. 4, with leak port 230 closed and pressure being constantly supplied past needle valve 216 to control chamber 188, the pressure will gradually increase in control chamber 188 to exert a downward force on diaphragm 178. When this force becomes great enough to overcome the force of spring 206 and the force of the pressure in balance chamber 186, control chamber 188 will expand moving valve actuating stem 202 downward until the lower end of passage 204 is seated against the hemispherical portion 160 of pilot valve 158. This position is illustrated in FIG. 4 and communication has been cut off between the branch chamber 184 and atmosphere. Upon a further increase in the pressure in chamber 188, valve actuating stem 202 will overcome the resistance of pilot valve spring 164 and move pilot valve 158 away from port 152 to admit a control pressure into chamber 184, passage 246, past restriction 250, and through passage 248 to chamber 24 of the pneumatic motor 20.

As the pressure increases in chamber 24, diaphragm 18 will move downwardly against spring 22 to increase the opening of valve 12 permitting greater flow through conduit 14. However, sensing spring 116 causes spring plate 118 to follow the movement of the diaphragm, and this motion is transmitted through sensing wire 108 to shaft 90. Downward movement of spring 118 causes counterclockwise rotation of shaft 90 as viewed in FIGS. 2 and 3, and cam 94 rotates with the shaft. Fulcrum 268 of sensing lever 264 follows the rotation of cam 94 which causes sensing lever 264 to pivot in a counterclockwise direction about its fixed axis 262. The upward movement of sensing lever 264 in turn causes counterclockwise pivotal movement of control lever 278 about its movable axis 276 which moves the free end 294 of control lever 278 in a direction away from flapper 238 permitting it to move away from leak port 230. Control lever 278 and flapper 238 come to rest at a position with the pressure in control chamber 188 balanced with the pressure in balance chamber 186, branch chamber 184, and the force exerted by spring 206, with the pilot valve and valve actuating stem in the position illustrated in FIG. 4. Valve 12 is thus maintained in the new position until the temperature begins to return to normal. As the temperature deviation begins to decrease, the pressure in signal chamber 46 gradually decreases, permitting plunger element 68 to move downwardly with the bias of spring 74 causing a corresponding reduction in the pressure in control chamber 188. As the pressure in control chamber 188 decreases, valve actuating stem 202 moves out of engagement with exhaust portion 160 with the pilot valve permitting the pressure in branch chamber 184 to exhaust to atmosphere until the upward force exerted by the pressure in branch chamber 184, balance chamber 186 and the force exerted by spring 206 is equal to the force exerted by the pressure in control chamber 188 acting on diaphragm 178, each reduction in pressure in control chamber 188 permitting a corresponding movement of valve 12 toward its original position. When the temperature returns to normal, plunger 68 moves to its lowermost position illustrated in FIG. 3 permitting flapper 238 to be moved away from leak port 230 reducing the pressure in control chamber 188 and permitting the branch chamber to be exhausted to atmosphere and valve 12 to return to its neutral position.

The provision of balance chamber 186 acting in opposition to the control chamber permits operation of the relay over a wide range of supply pressures and further acts to reduce "hunting" by pilot valve 158. Further anti-hunting is provided by spring 206 which also acts to prevent too large a flow through port 150 with small changes in signal pressure. By restricting the flow from passage 208 to control chamber 188, the pressure in control chamber 188 builds up gradually which also prevents undesirable opening of pilot valve 158.

Adjustable restriction 250 in passage 246 limits the flow to and from the valve operator to reduce the tendency of valve 12 to "hunt" and permits the device to be used with valve operating motors of varying sizes.

The calibrated scale on control lever 278 permits the fulcrum 284 of the control lever to be adjusted to vary the stroke in inches with each p.s.i. change in signal pressure. The scale reads in terms of a factor equal to signal pressure in p.s.i. divided by valve stroke in inches. Adjustment of screw 284 clockwise, as viewed in FIG. 1, increases the start point, that is the signal pressure at which the free end of control lever 278 will engage flapper 238.

Figure 6:
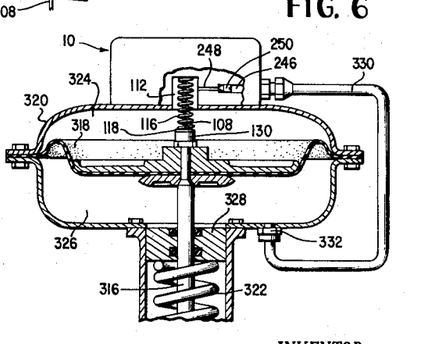
FIG. 6 is a view similar to FIG. 5 illustrating the positioner connected to operate for reverse action.

The control has been described thus far as providing direct action on the valve operator, that is, increases in signal pressure cause the valve operating diaphragm to move downwardly. In FIG. 6, the controller is illustrated connected to a valve operating motor to provide reverse action on the valve operating diaphragm.

In FIG. 6, the controller 10 is mounted on a pneumatic motor 320 having a diaphragm 318 which divides the interior of the motor into chambers 324 and 326, chamber 324 preferably communicating with atmosphere. Valve stem 316 is connected with diaphragm 318 and slidably extends through a bushing 328 provided with O-rings to seal chamber 326 from atmosphere. Valve spring 322 has its upper end seated against bushing 328 and biases stem 316 and diaphragm 318 downwardly. Accordingly, fluid pressure in chamber 326 urges diaphragm 318 and stem 316 upwardly against spring 322. Spring plate 118 is shown in FIG. 6 with extension 130 attached, and extension 130 is centrally positioned against diaphragm 318 in the manner previously described with reference to FIG. 5 and is maintained against the diaphragm by sensing spring 116.

For reverse action, adjustable restriction 250 is rotated until it closes off passage 248 from branch passage 246. Cam 94 is reversed from the position shown in FIGS. 1-3 so that clockwise rotation of shaft 90 causes a rise in the cam surface. Cap plug 254 is removed and outlet 252 (FIG. 3) is connected with one end of a conduit 330, the other end of which is connected at 332 with the casing wall of chamber 326. Thus, an increase in signal pressure in chamber 46 causes a control pressure to be established in chamber 326 through conduit 330. As valve operating diaphragm 318 rises in response to the increase in pressure in chamber 326, sensing spring 116 contracts and clockspring 100 causes cam 94 to rotate in a clockwise direction to adjust the position of flapper 238. Controller 10 is therefore adaptable for use with various types and sizes of operating motors and for both reverse and direct action.

While a specific example of the invention has been illustrated and described, it will be understood that the invention is not limited to the precise construction illustrated, and that various alterations and modifications in the construction and arrangement of parts are possible within the scope of the invention as defined in the appended claims.

I claim:
1. In apparatus for controlling a variable condition by varying the position of a control element, the combination comprising:
   a pneumatic motor having a movable wall for actuating the element;
   a relay mechanism including a casing having a control chamber, balance chamber, branch chamber and a pilot chamber,
      a first movable member forming one wall of the control chamber,
      a second movable member spaced from the first movable member forming one wall of the balance chamber,
      means connecting the space between the first and second members with atmosphere,
      a third movable member spaced from the second member and forming one wall of the branch chamber and the other wall of the balance chamber,
      the second movable member having a greater effective area than the third member,
      a port providing communication between the pilot chamber and the branch chamber,
      a normally closed valve controlling flow through said port,
      an actuating element connecting the movable members,
      a passage in said actuating element opening at one end in the branch chamber and opening at the other end into the space between the first and second movable members,
      means connecting the control chamber, balance chamber and pilot chamber with a supply of fluid under pressure, the pressure in the control chamber acting on the first movable member to urge the actuating element toward engagement with the pilot valve to close said one end of the passage and open the pilot valve to admit fluid pressure to the branch chamber from the pilot chamber, the pressure in the balance chamber acting on the second movable member to urge said actuating element in an opposite direction,
      means connecting the branch chamber with the pneumatic motor,
      a leak port for the control chamber,
      a pivoted flapper movable relative to the leak port to increase and decrease the pressure in the control chamber;
   a sensing lever having one end pivoted about a fixed axis;
   a control lever fulcrumed intermediate its ends on the sensing lever and pivoted at one end about the movable axis, the free end of the control lever being movable to engage the flapper means and position the flapper relative to the leak port;

means for moving the movable axis to a position corresponding to a variation in the condition being controlled to position the flapper relative to the leak port to establish a control pressure in the pneumatic motor;

and means to thereafter pivot the sensing lever about its fixed axis to adjust the position of the throttling means relative to the leak port in accordance with the position of the control element.

2. In apparatus for controlling a variable condition by varying the position of a control element, the combination comprising:

a pneumatic motor having a movable wall for actuating the element;

a fluid relay including a casing having a control chamber, balance chamber, branch chamber and a pilot chamber, a first diaphragm forming one wall of the control chamber, a second diaphragm forming one wall of the balance chamber having an effective area less than the first diaphragm, the space between the first and second diaphragms being opened to atmosphere, a third diaphragm forming one wall of the branch chamber and the other wall of the balance chamber and having an effective area less than the second diaphragm, a port providing communication between the branch chamber and the pilot chamber, a normally closed pilot valve controlling flow through said port, an actuating member connecting the diaphragms, a passage in the actuating member having one end opening into the branch chamber and the other end opening into the space between the first and second diaphragms, said member being movable into engagement with the pilot valve to close said one end of the passage and shut off communication between the branch chamber and atmosphere, and further movable to open the pilot valve and connect the pilot chamber with the branch chamber, a spring biasing the member away from the pilot valve, a supply passage in the relay casing connected to a supply of air under pressure, said control chamber, balance chamber and pilot chamber being connected to said passage, a variable restriction controlling flow from said supply passage to the control chamber, a leak port for the control chamber, throttling means movable relative to the leak port to control the pressure in the control chamber;

means connecting the branch chamber of the fluid relay with the pneumatic motor;

a sensing lever having one end pivoted about a fixed axis;

a control lever fulcrumed intermediate its ends on the sensing lever and pivoted at one end about a movable axis, the free end of the control lever being movable to engage the throttling means and position the throttling means relative to the leak port;

means for moving the movable axis to a position corresponding to a variation in the condition being controlled to position the throttling means relative to the leak port to establish a control pressure in the pneumatic motor;

and means to thereafter pivot the sensing lever about its fixed axis to adjust the position of the throttling means relative to the leak port in accordance with the position of the control element.

3. In apparatus for controlling a variable condition by varying the position of a control element, the combination comprising:

a pneumatic motor having a movable wall for controlling the position of the element;

a fluid relay including a casing having a control chamber, balance chamber, branch chamber and a pilot chamber, a first movable member forming one wall of the control chamber, a second movable member spaced from the first movable member forming one wall of the balance chamber, means connecting the space between the first and second movable members with atmosphere, a third movable member spaced from the second movable member and forming one wall of the branch chamber and the other wall of the balance chamber, the second member having a greater effective area than the third member, a port providing communication between the pilot chamber and the branch chamber, a normally closed pilot valve controlling flow through said port, an actuating element connecting the movable members, a passage in said actuating element opening at one end in the branch chamber and opening at the other end into the space between the first and second movable members, means connecting the control chamber, balance chamber and pilot chamber with a supply of fluid under pressure, the pressure in the control chamber acting on the first movable member to urge the actuating element toward engagement with the pilot valve to close said one end of the passage shutting off communication between the branch chamber and atmosphere and to open the pilot valve and admit fluid pressure to the branch chamber from the pilot chamber, the pressure in the balance chamber acting on the second movable member to urge said actuating element in an opposite direction, a leak port for the control chamber, a pivoted flapper movable relative to the leak port to control the pressure in the control chamber;

means connecting the branch chamber of the fluid relay with the pneumatic motor;

a sensing lever pivoted at one end about a fixed axis;

a control lever fulcrumed intermediate its end on said sensing lever and pivoted at one end about a movable axis, the free end of the control lever being movable about the fulcrum to engage the flapper and move the flapper relative to the leak port;

means for moving said movable axis to a position corresponding with a variation in the condition being controlled to position the flapper relative to the leak port and establish a control pressure in the pneumatic motor;

means for adjusting the position of the flapper in accordance with the position of the element including, a rotatable shaft, means biasing the shaft against rotation, a spring plate biased for movement with the movable wall of the pneumatic motor, an element position sensing wire wound around the shaft and having its free end connected with the spring plate, a cam mounted on the shaft for rotation therewith;

said sensing lever being fulcrumed against said cam and movable upon rotation of the cam to pivot the free end of the control lever about said movable axis to adjust the position of the flapper relative to the leak port in accordance with the position of the control element.

4. In apparatus for controlling a variable condition by varying the position of the control element, the combination comprising:
a pneumatic motor having a movable wall for actuating the element;
a fluid relay including a casing having a control chamber, balance chamber, branch chamber and a pilot chamber,
    a first diaphragm forming one wall of the control chamber,
    a second diaphragm forming one wall of the balance chamber having an effective area less than the first diaphragm,
    the space between the first and second diaphragms being open to atmosphere,
    a third diaphragm forming one wall of the branch chamber and the other wall of the balance chamber and having an effective area less than the second diaphragm,
    a port providing communication between the branch chamber and the pilot chamber,
    a normally closed pilot valve controlling flow through said port,
    an actuating member connecting the diaphragm,
        a passage in the member having one end opening into the branch chamber and the other end opening into the space between the first and second diaphragms,
        said member being movable into engagement with the pilot valve to close said one end of the passage and shut off communication between the branch chamber and atmosphere, and further movable to open the pilot valve and connect the pilot chamber with the branch chamber,
    a spring biasing the member away from the pilot valve,
    a supply passage in the relay casing connected to a supply of air under pressure,
    said control chamber, balance chamber and pilot chamber being connected to said passage,
    a variable restriction controlling flow from said supply passage to the control chamber,
    a leak port for the control chamber,
    a pivoted flapper movable relative to the leak port to control the pressure in the control chamber;
means connecting the branch chamber of the fluid relay with the pneumatic motor;
a sensing lever having one end pivoted about a fixed axis;
a control lever fulcrumed intermediate its ends on the sensing lever and pivoted at one end about a movable axis, the free end of the control lever being movable to engage the flapper and position the flapper relative to the leak port;
means for moving the movable axis to a position corresponding to a variation in the condition being controlled to position the flapper relative to the leak port to establish a control pressure in the pneumatic motor;
and means to thereafter pivot the sensing lever about its fixed axis to adjust the position of the flapper relative to the leak port in accordance with a position of the control element.

5. In apparatus for controlling a variable condition by varying the position of the control element, the combination comprising:
a pneumatic motor for actuating the element;
a fluid relay including a casing having a control chamber, balance chamber, branch chamber and a pilot chamber,
    a first movable member forming one wall of the control chamber,
    a second movable member spaced from the first movable member and forming one wall of the balance chamber,
    means connecting the space between the first and second members with atmosphere,
    a third movable member spaced from the second movable member and forming one wall of the branch chamber and the other wall of the balance chamber,
    the second movable member having a greater effective area than the third movable member,
    a port providing communication between the pilot chamber and the branch chamber,
    a normally closed valve controlling flow through said port,
    an actuating element connecting the movable members, a passage in said actuating element opening at one end into the branch chamber and opening at the other end into the space between the first and second movable members,
    means connecting the control chamber, balance chamber and pilot chamber with a supply of fluid under pressure;
a passage connecting the branch chamber with the pneumatic motor;
means responsive to variations in the condition being controlled for moving the flapper toward the leak port increasing the pressure in the control chamber causing the actuating member to move against the bias of the spring and the force exerted by the pressure in the balance chamber to open the pilot valve and establish a control pressure in the branch chamber;
and element position sensing means for adjusting the position of the flapper relative to the leak port in accordance with the position of the control element.

6. In apparatus for controlling a variable condition by varying the position of a control element, the combination comprising:
a pneumatic motor for actuating the element;
relay mechanism including a casing having a control chamber, balance chamber, branch chamber and a pilot chamber,
    a first diaphragm forming one wall of the control chamber,
    a second diaphragm forming one wall of the balance chamber having an effective area less than the first diaphragm,
    the space between the first and second diaphragms being opened to atmosphere,
    a third diaphragm forming one wall of the branch chamber and the other wall of the balance chamber and having an effective area less than the second diaphragm,
    a port providing communication between the branch chamber and the pilot chamber,
    a normally closed pilot valve controlling flow through said port,
    an actuating member carried by the second and third diaphragms and engageable by said first diaphragm,
        a passage in the member having one end opening into the branch chamber and the other end opening into the space between the first and second diaphragms,
        said member being movable into engagement with the pilot valve to close said one end of the passage and shut off communication between the branch chamber and atmosphere, and further movable to open the pilot valve and connect the pilot chamber with the branch chamber, a spring biasing the member away from the pilot valve, a supply passage in the relay casing connected to a supply of fluid under pressure, said control chamber, balance chamber and the pilot chamber being connected to said passage, a variable restriction controlling flow from said supply passage to the control chamber, a leak port for the control chamber, a pivoted flapper movable relative to the leak port to control the pressure in the control chamber;

a passage connecting the branch chamber with the pneumatic motor;

means responsive to variations in the condition being controlled for moving the flapper toward the leak port increasing the pressure in the control chamber causing the member to move against the bias of the spring and the force exerted by the pressure in the balance chamber and open the pilot valve to establish a control pressure in the branch chamber;

and element position sensing means for adjusting the position of the flapper relative to the leak port in accordance with the position of the element.

7. A pneumatic relay comprising:

a casing;

a control chamber, balance chamber, branch chamber and pilot chamber formed in the casing;

a first diaphragm forming one wall of the control chamber;

a second diaphragm spaced from the first diaphragm forming one wall of the balance chamber;

a third diaphragm spaced from the second diaphragm forming one wall of the branch chamber and the other wall of the balance chamber;

means connecting the space between the first and second diaphragms with atmosphere;

an actuating member connecting the second and third diaphragms and engageable with the first diaphragm;

said second diaphragm having a greater effective area than the third diaphragm so that the pressure in the balance chamber exerts a force in opposition to the force exerted by the pressure in the control chamber;

a port providing communication between the branch chamber and the pilot chamber;

a normally closed pilot valve controlling flow through the port;

a passage in said actuating member opening at one end into the branch chamber and at the other end into the space between said first and second diaphragms;

said actuating member being movable upon an increase in pressure in the control chamber to engage the pilot valve closing at one end of the passage shutting off communication between the branch chamber and atmosphere, and further movable to open the pilot valve to connect the branch chamber with the pilot chamber;

means connecting the control chamber, balance chamber and pilot chamber with a source of fluid under pressure;

a leak port for the control chamber, and a pivoted flapper movable relative to the leak port for varying the pressure in the control chamber to control supply and waste of fluid pressure to the branch chamber.

8. A pneumatic relay comprising:

a housing having a control chamber, a balance chamber, a branch chamber and a pilot chamber;

a first movable member forming one wall of the control chamber;

a second movable member spaced from the first movable member forming one wall of the balance chamber;

means connecting the space between the first and second members with atmosphere;

a third movable member spaced from the second member and forming one wall of the branch chamber and the other wall of the balance chamber;

the second member having a greater effective area than the third member;

a port providing communication between the pilot chamber and the branch chamber;

a normally closed valve controlling flow through said port;

an actuating element connecting the movable members;

a passage in said actuating element opening at one end into the branch chamber and at the other end into the space between the first and second movable members;

means connecting the control chamber, balance chamber and pilot chamber with a supply of fluid under pressure, the pressure in the control chamber acting on the first movable member to urge the actuating element toward engagement with the pilot valve to close said one end of the passage shutting off communication between the branch chamber and atmosphere and to open the pilot valve and admit fluid pressure to the branch chamber from the pilot chamber, the pressure in the balance chamber acting on the second movable member to urge said actuating element in an opposite direction;

and means for varying the pressure in the control chamber to control supply and waste of fluid pressure to the branch chamber.

9. Apparatus for controlling a variable condition by varying the position of a control element upon a deviation of the condition from a desired value comprising;

a pneumatic motor including a hollow casing with a pressure responsive movable wall therein connected to the control element, a horizontal base member mounted on said casing, an expansible control chamber on said base adjacent one end thereof, means for controlling supply and waste of air to one side of the pressure responsive movable wall of the pneumatic motor in response to expansion and contraction of the control chamber, means supplying air under pressure to the control chamber, a leak port for the control chamber, a pivoted flapper movable relative to the leak port to vary the pressure in the control chamber, an expansible signal chamber on said base adjacent the opposite end thereof from said control chamber, a shaft rotatably mounted on said base between said control chamber and said signal chamber, means biasing said shaft against rotation, a cam fixedly mounted on said shaft, a sensing lever pivoted about a fixed axis on said base on the same side of said shaft as said signal chamber, said sensing lever being fulcrumed intermediate its ends against the cam and pivotally movable about its fixed axis upon rotation of said cam, a control lever pivotally connected to the movable wall of the signal chamber and fulcrumed intermediate its ends on said sensing lever with its free end engageable with the flapper to move the flapper relative to the leak port, a spring plate biased into engagement with the movable wall of said pneumatic motor and movable with said movable wall;

an element position sensing wire wound around said shaft and having its free end attached to said spring plate;

and means for establishing a signal pressure in the signal chamber in accordance with variations in the condition being controlled to pivot the control lever about its fulcrum to establish a control pressure in the pneumatic motor, said sensing wire causing rotation of the cam upon movement of the movable wall of the pneumatic motor to pivot the control lever about its movable axis and adjust the position of the flapper relative to the leak port in accordance with the position of the element.

References Cited in the file of this patent

UNITED STATES PATENTS

| | | |
|---|---|---|
| 2,264,262 | Erbguth | Nov. 25, 1941 |
| 2,298,112 | Edwards et al. | Oct. 6, 1942 |
| 2,911,954 | Huston et al. | Nov. 10, 1959 |
| 3,040,714 | Taiclet | June 26, 1962 |

FOREIGN PATENTS

| | | |
|---|---|---|
| 212,659 | Austria | Dec. 27, 1960 |